United States Patent [19]

Edge et al.

[11] 4,116,661
[45] Sep. 26, 1978

[54] SUBMERGED DAM BARRIERS FOR SELECTIVE DIVERSION OF MOLTEN METAL FLOW IN A GLASS FORMING CHAMBER

[75] Inventors: Charles K. Edge, Sarver, Pa.; Thomas J. Nier, Corpus Christi, Tex.

[73] Assignee: PPG Industries, Inc., Pittsburgh, Pa.

[21] Appl. No.: 840,200

[22] Filed: Oct. 7, 1977

[51] Int. Cl.² ............................................. C03B 18/02
[52] U.S. Cl. .................................. 65/182 R; 65/99 A
[58] Field of Search ............................ 65/99 A, 182 R

[56] References Cited

U.S. PATENT DOCUMENTS 3,479,171   11/1969   Robinson et al. ................... 65/99 A
3,925,051   12/1975   Lawhon ........................... 65/99 A X Primary Examiner—Arthur D. Kellogg
Attorney, Agent, or Firm—E. Kears Pollock

[57] ABSTRACT

A glass forming chamber wherein glass is formed while floating on the surface of a pool of molten metal is provided with submerged dam barriers in the pool of molten metal which dam barriers are contoured to inhibit the flow of molten metal in a central portion of the pool beneath an advancing layer of glass relative to the flow of molten metal in marginal portions of the pool including marginal portions between the edges of a floating layer of glass and side walls of the forming chamber.

6 Claims, 4 Drawing Figures

SUBMERGED DAM BARRIERS FOR SELECTIVE DIVERSION OF MOLTEN METAL FLOW IN A GLASS FORMING CHAMBER

BACKGROUND OF THE INVENTION

1. Field of the Invention

This invention relates to the art of manufacturing flat glass, wherein molten glass is delivered onto a surface of a pool of molten metal and formed while floating on the molten metal into a continuous sheet of glass. More particularly, this invention relates to improved dam barriers positioned in the glass-supporting molten metal to control convection currents or flow of molten metal within the pool.

2. Brief Description of the Prior Art

The use of dam barriers to influence thermal conditions within a glass-supporting pool of molten metal in a glass forming chamber has long been recognized. For example, U.S. Pat. No. 789,911 to Hitchcock discloses the use of a plurality of barriers to segregate a glass-supporting pool of molten metal into a plurality of pool segments, each of which may be selectively maintained at a desired temperature to permit the cooling and forming of glass as it passes over each segment of the pool during its travel through a forming chamber.

U.S. Pat. No. 3,317,302 to Misson discloses the use of dam barriers which are sufficiently beneath the glass-supporting surface of a pool of molten metal so that, while segregating the pool into several segments, they permit the flow of molten metal along the length of the forming chamber to a desired degree to effect the cooling of the glass during its formation.

U.S. Pat. No. 3,584,475 to Galey and Sensi discloses dam barriers extending transversely across the bottom of a glass forming chamber which are contoured to provide for a greater inhibition of molten metal flow along the margins of a forming chamber than in the central portion of the forming chamber.

U.S. Pat. No. 3,930,829 to Sensi discloses the use of dam barriers in a forming chamber, some of which are positioned inwardly from the side walls of the forming chamber so that the flow of molten metal along the extreme marginal portions of the forming chamber is not inhibited by the presence of a dam barrier while the flow of molten metal throughout a major central portion of the forming chamber is inhibited by the presence of the dam barriers. In this patent, Sensi also discloses the use of short dam barriers which do not extend across the full width of a forming chamber such as dam barriers 280 shown in FIG. 14 of U.S. Pat. No. 3,930,829. It is recognized that these dam barriers alone would locally inhibit the flow of molten metal in the pool of molten metal while permitting the flow of molten metal in both a central portion of the pool and in marginal portions of the pool beyond the barriers 280.

Modeling of glass forming processes has indicated that some short circuiting of molten metal flow over submerged dam barriers results in a fast flow of molten metal along with the advance of glass along its surface immediately adjacent the interface between the glass and the molten metal. This flow appears to reduce the effectiveness of submerged dam barriers. The present invention is therefore directed to an improved method and apparatus for the control of molten metal flows within the glass-supporting pool of molten metal.

SUMMARY OF THE INVENTION

A flat glass forming chamber which contains a pool of glass-supporting molten metal is provided with one or more dam barriers submerged in the pool of molten metal. The forming chamber includes other conventional features such as a facility for delivering a continuous stream of molten glass onto the surface of the pool of molten metal; apparatus for advancing and applying forces to the glass to form it into a dimensionally stable, continuous sheet of glass of desired width and thickness; coolers for removing heat from the glass (including means for transferring heat from the glass to and through the glass-supporting molten metal); and a facility for removing a formed continuous sheet of flat glass from the surface of the pool of molten metal and from the forming chamber.

A submerged dam barrier is positioned in the chamber and extends at least partially transversely across the chamber and transversely to the direction of glass advance through the chamber. The dam barrier has an upper surface spaced immediately below the glass-supporting molten metal interface in a central portion of the forming chamber. The dam barrier has its upper surface spaced a greater distance from the upper surface of the pool of molten metal in a marginal portion of the glass forming chamber. This arrangement permits a greater flow of molten metal over the dam barrier along the marginal portion of the forming chamber and permits less surface flow of molten metal along the central portion of the forming chamber. A preferred dam barrier extends substantially across the glass forming chamber so that its ends are adjacent to or closely spaced from side walls of the forming chamber. It includes a central portion having its upper surface spaced substantially immediately below the upper surface of the pool of molten metal which embraces a major central portion of the forming chamber over which glass advances during operation. It marginal portions have upper surfaces which are spaced more deeply beneath the upper surface of the pool of molten metal than in the central portion of the forming chamber. The marginal portions of the forming chamber include those portions of the pool of molten metal over which glass does not normally advance but rather where the upper surface of the pool of molten metal is exposed to a headspace.

The upper surface of a dam barrier, such as employed in this invention, may be a continuous, smooth, curved surface or it may be a series of flat surfaces angularly intersecting one another. Preferably, the upper surface of the dam barrier in a central portion of the forming chamber over which molten glass is to be advanced will be spaced from the upper surface of the pool of molten metal a distance of from about 1/16 to 3/16 inch (1.6 to 4.8 millimeters). In the marginal portions the spacing between the upper surface of the pool of molten metal and the upper surface of the dam barrier may vary from ⅛ inch to 1½ inches (3.2 to 38.1 millimeters). For a barrier having a smooth, upper surface or an upper surface comprised of sloped segments, the depth will continuously vary along the sloped or curved upper surface of the dam barrier with the marginal extreme of the dam barrier having the greatest spacing between the upper surface of a pool of molten metal and the upper surface of the dam barrier. For dam barriers having a single or a series of steps forming an upper surface, the distance between the upper surface of the pool of molten metal and the outermost segment will be from about 1 to 3 inches (2.5 to 7.5 centimeters).

The relative spacings between the upper surface segments of a submerged dam barrier employed in this invention may be stated in terms of depths relative to the full depth of the pool of molten metal in the forming chamber so that the present invention may be applied to a glass forming chamber of any size or scale. Preferably, the upper surface of the dam barrier is spaced from 1 percent to 25 percent beneath the upper surface of the pool of molten metal relative to the full depth of the pool of molten metal in a central portion of the glass forming chamber. Meanwhile, the preferred dam barrier has its upper surface spaced from 4 percent to 75 percent beneath the upper surface of the pool of molten metal relative to the depth of the pool of molten metal in marginal portion of the chamber.

With such spacing it is evident that the flow of molten metal is completely inhibited at depths of from 75 percent to 99 percent of the pool in the central portion of the pool and at depths of from 25 percent to 96 percent of the pool in the marginal portions of the pool while flow is substantially uninhibited in the central portion of the pool at depths near the surface of from 0 to 25 percent of the pool depth and is substantially uninhibited in the marginal portions of the pool at depths near the surface of from 0 to 75 percent of the pool depth.

The relative widths of the designated portions of a dam barrier having a discrete central portion are as follows: The high central portion may be from 1 percent to 75 percent of the width of the forming chamber in which the dam is employed. Each marginal portion may be from 12.5 percent to 49.5 percent of the width of the forming chamber. Of course, there may be no discrete central portion in the instance of a dam barrier having a continuous curved upper surface or on having slopped portions rising to a common apex. For such embodiments the dam barrier is arbitrarily considered as having a central portion and marginal portions each comprising one-third of its length (across the width of the chamber) and average upper surface heights are referred to in specifying the dam barrier.

Within the central portion of the forming chamber, the dam barrier serves to effectively inhibit the longitudinal flow of molten metal along the path of glass advance both in the direction of glass advance and counter to it. The dam barrier then may be seen to cause outwardly diverging flows of molten metal by reason of continuity of mass of the molten metal. This serves to distribute hot molten metal from the central portion of the forming chamber outwardly into marginal portions of the forming chamber. As a result, the glass being formed while supported on the pool of molten metal encounters a more uniform thermal environment than it would otherwise encounter and the quality of glass may be improved. This invention may be further appreciated with reference to the accompanying drawings.

DESCRIPTION OF THE PREFERRED EMBODIMENTS

Figure 1:
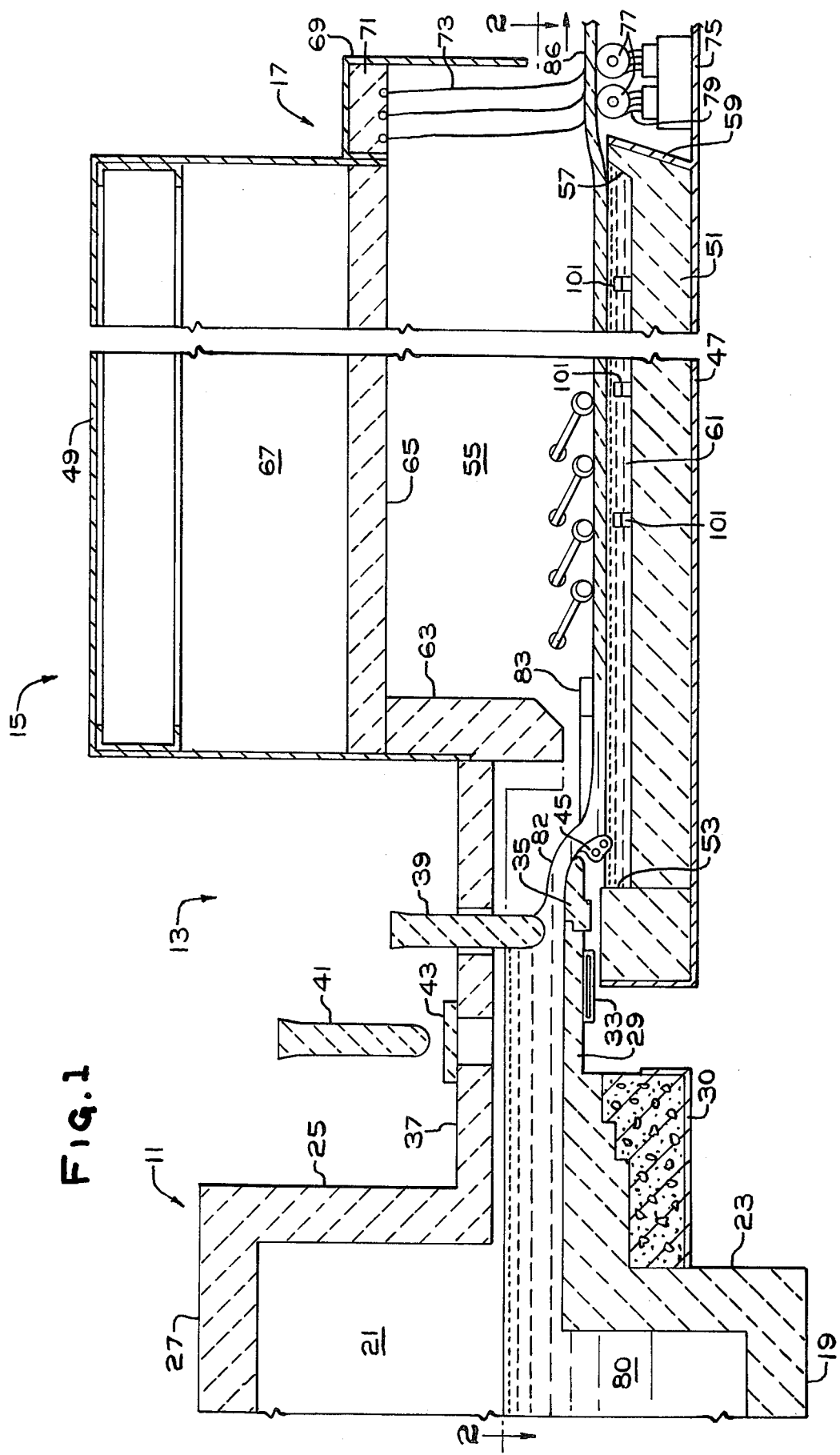
FIG. 1 is a longitudinal sectional elevation of a glassmaking apparatus employed in the practice of this invention.
Figure 2:
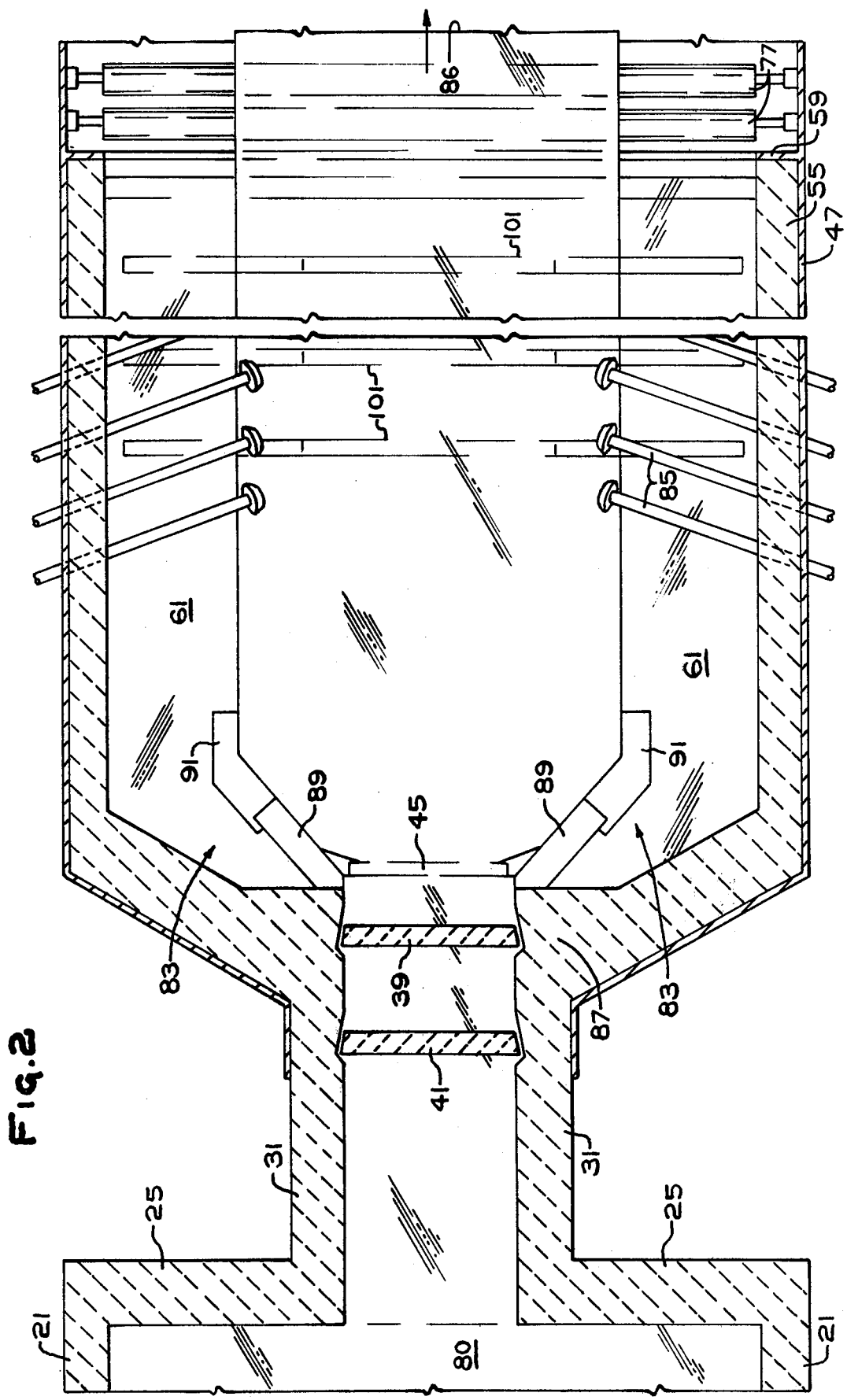
FIG. 2 is a sectional plan of the glassmaking apparatus shown in FIG. 1 taken along section line 2—2 of FIG. 1.

Referring to FIGS. 1 and 2, there is shown a glassmaking apparatus comprising a glassmaking furnace or tank 11 connected through a molten glass delivery facility 13 to a glass forming chamber 15. The forming chamber 15 is, in turn, connected to a glass lift-out and removal facility 17. The glassmaking furnace 11 includes a furnace bottom 19, side walls 21, a front basin wall 23, an upper front wall 25, and a crown or roof 26 extending between the side walls. The glassmaking furnace 11 includes a melter (not shown) in addition to a conditioner which has its downstream or discharge end illustrated. The glassmaking furnace 11 serves to melt and refine glass and to condition the glass for delivery to the forming chamber 15.

The molten glass delivery facility 13 includes a canal bottom 29 and canal side walls 31 which together form a channel or canal through which molten glass can flow from the furnace 11 to the forming chamber 15. The canal bottom 29 may be mounted on a structure 33 which includes a cooler. The canal bottom 29 terminates with a lip 35 which is shown mounted above and extending over a pool of molten metal in the forming chamber. The molten glass delivery facility 13 further includes a roof 37 having openings through it for receiving metering members or tweels. An operating tweel 39 is mounted to extend downwardly through an opening in the roof 37, it is mounted by means (not shown) for raising and lowering the tweel 39 to provide an opening of controlled size defined by the operating tweel 39, the canal bottom 29 and canal side walls 31 in order to meter or control the flow of molten glass from the furnace 11 through the canal to the forming chamber 15. A backup tweel 41 is also provided. It is mounted in a manner similar to the mounting for the operating tweel 39. It is employed to control the flow of molten glass during periods when the operating tweel is being replaced or under repair and is used to close off the flow of molten glass entirely during periods of maintenance of the forming chamber 15 or maintenance or replacement of the lip 35. A cover block or tile 43 may be provided over the opening for receiving the backup tweel 41 when the backup tweel 41 is removed from the canal.

A lip extension piece 45 may be mounted on the lip 35 to extend the surface which supports molten glass during its delivery. The surface which supports molten glass during its delivery can be positioned to contact a pool of molten metal in the forming chamber onto which molten glass is to be delivered.

The forming chamber 15 includes a bottom casing 47 and an upper casing 49 which together provide an enclosure for the chamber. Mounted within the bottom casing 47 is a bottom liner 51 of refractory material. Fixed across the inlet or upstream end of the forming chamber 15 is an end wall 53. Side walls 55 extend along the length of the forming chamber inside both the lower and upper casings. An exit end lip 57 extends across the exit end of the forming chamber and is mounted within an exit lip casing or plate 59.

A pool of molten metal 61, preferably tin or an alloy of tin, is contained inside the forming chamber in a container formed by the bottom liner 51, the hot end wall 53, the side walls 55, and the exit lip 57. A space called a headspace overlies the pool of molten metal 61 between the side walls of the forming chamber. A lintel 63 extends across the inlet of the forming chamber above the lip 35 and inside the upper casing 49. A ceiling or roof 65 extends from the lintel between the side walls 55 along the length of the forming chamber and separates the headspace from a plenum or service space 67 located above the roof 65 but within the upper casing 49.

The glass lift-out and removal facility 17 includes a canopy 69 which is provided with thermal insulation 71. The canopy 69 serves to support a plurality of drapes or curtains 73 which extend transversely across a path for glass removal and into close proximity to a conveyer for glass in order to seal the interior of the forming chamber from the outside environment. The lift-out facility 17 further includes a support 75 with lift-out rolls 77 mounted on it. The lift-out rolls 77 may be provided with seals 79.

During operation, a pool of molten glass 80 is maintained within the furnace 11. A stream of molten glass 82 is withdrawn from the furnace 11 and flows through the delivery facility 13 beneath the operating tweel 39 and over the lip 35 with its extension piece 45 directly onto the surface of the pool of molten metal 61 in the forming chamber. A pair of diverging guides 83 is preferably provided to confine the delivered molten glass and to establish a body of molten glass on the surface of the pool of molten metal 61 of desired width for forming into a continuous sheet of flat glass.

After the glass advances from between the diverging guides 83, it may be engaged along its marginal portions by edge rolls 85 which impose tractive and attenuating forces to the glass and serve to maintain or control its width as it is attenuated to a desired thickness as a dimensionally stable, continuous sheet or ribbon of glass 86. The continuous sheet of glass 86 is then removed from the pool of molten metal and from the forming chamber for further processing and use. The diverging guides 83 are preferably made of a material such as silica or alumina which is wet by glass. Each guide includes a diverging piece 89 as well as an end piece 91 to establish the width of the advancing glass. Preferably, the width of the glass advancing from between the guides is established as the width of the ribbon of glass 86 produced in the process.

Extending transversely across the forming chamber 15 and submerged in the pool of molten metal 61 are dam barriers 101 which are sloped dam barriers in the embodiment illustrated in FIGS. 1 and 2. Each sloped dam barrier has a central section with a generally horizontal, flat, upper surface and two marginal portions with generally flat, sloped upper surfaces. Each marginal portion extends inwardly from the side walls of the forming chamber and slightly inwardly of the marginal edges of glass advancing along the surface of the pool of molten metal.

Figure 3:
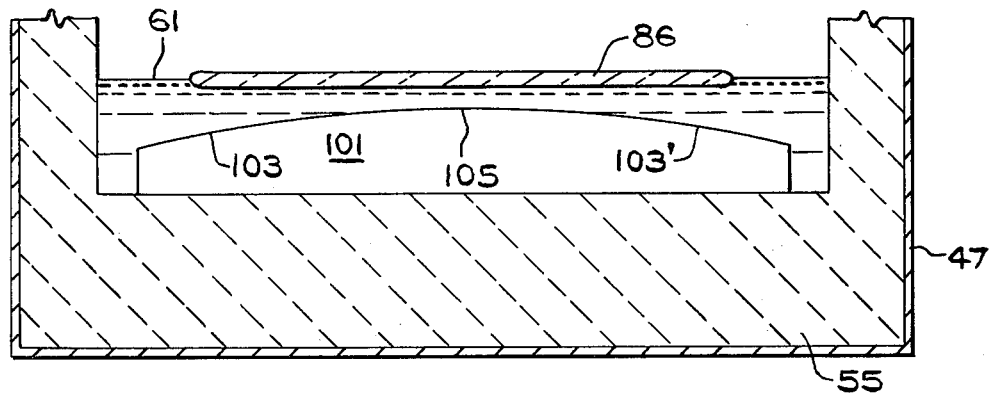
FIGS. 3 and 4 are transverse sectional elevations of a glass forming chamber illustrating various embodiments of the dam barriers which may be employed as embodiments of this invention.

In FIG. 3, there is illustrated a variant of the embodiment of dam barriers illustrated in FIGS. 1 and 2. The barrier 101 illustrated in FIG. 3 has an upper surface, that is, a continuous smooth curve having low side or marginal portions 103 and a high center portion 105.

Figure 4:
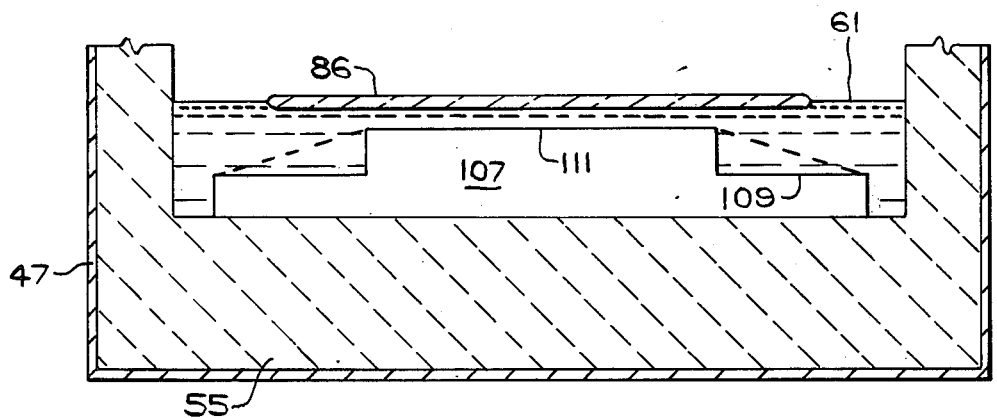

In FIG. 4 there is illustrated a further embodiment of a dam barrier suitable for use in this invention. This is a stepped or notched dam barrier 107 having low side portions 109 and a high central portion 111 with the demarcation between the low side portions 109 and the high central portion 111 being a vertical or near vertical step. Illustrated in phantom dash lines in FIG. 4 is the outline of the dam as illustrated in FIGS. 1 and 2 having two sloped marginal portions and a central horizontal portion.

Simulated model studies of a glass forming chamber employing water as a molten metal simulant and using dye to trace the flow of the molten metal simulant indicates that outwardly diverging surface flows may be established beneath an advancing layer of glass in the glass forming chamber through the use of dam barriers such as disclosed here. Outwardly diverging surface flows of molten metal are expected to provide a more uniform distribution of heat than usual throughout a glass-supporting pool of molten metal so that as glass is advanced and formed while being supported on such a pool of molten metal, it will be formed with minimal temperature deviations across its width which could give rise to optical distortion in the finished sheet of flat glass produced in such a forming chamber.

While this invention has been described with reference to particularly preferred embodiments, those skilled in the art of flat glass manufacture will appreciate that other embodiments of the invention may be devised which are within the spirit of this disclosure and within the scope of the appended claims.

We claim:

1. In a flat glass forming chamber including an enclosed chamber containing a pool of glass-supporting molten metal, means for delivering molten glass onto the pool of molten metal at an inlet end, means for removing a continuous sheet of glass from the pool of molten metal and from the chamber at an outlet end, means for advancing glass along the surface of the molten metal from the inlet end to the outlet end of the chamber while forming it into a continuous sheet of desired width and thickness and means for removing heat from the glass during its advance and for removing heat from the chamber, wherein there is provided in the pool of molten metal at least one dam barrier over which the glass can advance, the improvement which comprises a dam barrier having an upper surface above the bottom of the pool of molten metal and extending at least partially transversely across a glass forming chamber beneath the surface of the pool of molten metal, which dam barrier has a central portion of its upper surface spaced closer to the surface of the pool of molten metal in a central portion of the glass forming chamber than the upper surface of the marginal portion of the dam barrier in a marginal portion of the glass forming chamber for permitting a greater flow of molten metal over the dam barrier along the marginal portion than along the central portion of the glass forming chamber.

2. The glass forming chamber according to claim 1 wherein said dam barrier has an upper surface that is smoothly contoured providing a sloped descent along the surface of the dam barrier from a centrally disposed portion to a marginally disposed portion of the dam barrier.

3. The glass forming chamber according to claim 1 wherein said dam barrier has a stepped upper surface having a central portion at a first elevation and a marginal portion at a second elevation, lower than the first elevation.

4. The glass forming chamber according to claim 1 wherein said dam barrier has its upper surface spaced from 1 percent to 25 percent beneath the upper surface of the pool of molten metal relative to the depth of the pool of molten metal in a central portion of the chamber where glass is to fully cover the upper surface of the pool of molten metal and has its upper surface spaced from 4 percent to 75 percent beneath the upper surface of the pool of molten metal relative to the depth of the pool of molten metal in a marginal portion of the chamber where the upper surface of the pool of molten metal is to be at least partially free of glass.

5. The glass forming chamber according to claim 1 wherein there are provided a plurality of said dam barriers, each extending substantially transversely across the chamber and each longitudinally spaced from the next adjacent dam barrier.

6. The glass forming chamber according to claim 1 wherein said dam barrier extends substantially transversely across the chamber and the dam barrier upper surface which is spaced closer to the surface of the pool of molten metal extends across a central portion of the chamber comprising from 1 percent to 75 percent of the inside chamber width and the dam barrier has two marginal upper surface portions, each spaced farther from the surface of the pool of molten metal than the dam barrier surface in the central portion and each extending across a marginal portion of the chamber comprising from 49½ percent to 12½ percent of the inside chamber width.

* * * * *